Figure 1:
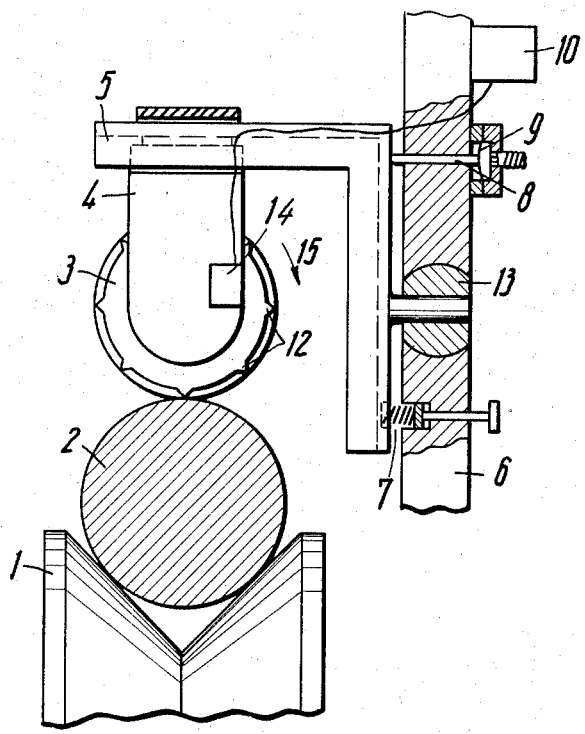

United States Patent [19]
Gfeller

[11] 3,816,926
[45] June 18, 1974

[54] LINEAR MEASURING DEVICE

[75] Inventor: Ernst Alfred Gfeller, Zurich, Switzerland

[73] Assignee: Markus Singeisen, Grenchen, Switzerland

[22] Filed: Aug. 8, 1972

[21] Appl. No.: 278,747

[30] Foreign Application Priority Data
Aug. 26, 1971  Switzerland..................... 12505/71

[52] U.S. Cl. .......... 33/141 R, 33/125 M, 33/141 C, 33/141 E, 74/25
[51] Int. Cl............................ G01b 3/12, G01b 7/04
[58] Field of Search .. 33/124, 141 R, 141 B, 141 C, 33/141 E, 125 M, 129, 134 R, 134 A, 132, 133, 141.5, 142; 74/25

[56] References Cited
UNITED STATES PATENTS
2,081,557  5/1937  Pierce et al........................ 73/185

Primary Examiner—William D. Martin, Jr.
Assistant Examiner—Steven L. Stephan
Attorney, Agent, or Firm—Brady, O'Boyle & Gates

[57] ABSTRACT

A rotatable measuring worm wheel having a plurality of worm helices of predetermined pitch thereon is urged into engagement with an object of substantial length to be measured which is arranged to travel adjacent the worm wheel. The axis of rotation of the worm wheel is arranged substantially parallel with the direction of travel of the object to be measured and the worm wheel is coupled to a counting unit to record the linear measurement of the moving object since each rotation of the worm corresponds to a measured distance equal to the pitch of the worm. In a modified form a pair of measuring worm wheels are arranged in spaced parallel relation with the helices arranged thereon so that the wheels rotate in opposite direction when the object to be measured engages and moves between the two wheels.

14 Claims, 3 Drawing Figures

LINEAR MEASURING DEVICE

The invention relates to a linear measuring device in which the object to be measured and a rotatable body pressed against the object are moved relative to one another along the length to be measured, and the rotatable body is thereby rotated to drive a measuring mechanism.

With known devices of this kind the rotatable body is a measuring wheel (or a measuring roller), the axis of which is disposed at right angles to the direction of motion, so that each rotation of the measuring wheel corresponds to a measured distance which is in principle equal to the periphery of the measuring wheel rolled off on the object to be measured. The measuring wheel is in contact with the object tangentially at one small surface area, which when measuring the length of a cylindrical body is theoretically punctiform. The measuring wheel follows the unevenness (hollows and rises) in the object which leads to errors in measurement because in this way a greater distance is measured than that of interest. In order to obtain the necessary frictional contact with the small area of contact the measuring wheel must be pressed against the object, and thus if the object is soft the measuring wheel is pressed into the surface of the object somewhat whereby a length greater than that to be measured is obtained. On the other hand with insufficient pressure measuring errors due to slipping can arise if the relative movement between measuring wheel and object is accelerated or decelerated. Wear on the measuring wheel or foreign bodies and dirt adhering to its periphery also lead to errors in measurement. Such foreign bodies and dirt adhere in particular to measuring wheels, the periphery of which are grooved or toothed in order to improve the frictional contact with the object. With such measuring wheels there also occur measurement errors depending upon how deep the shoulders of the grooves or the teeth penetrate into the object.

In accordance with the invention these disadvantages are avoided or mitigated by providing at least one measuring worm to be pressed against the object as a rotational body, the axis of which is disposed at least substantially parallel to the intended direction of motion. With this each rotation of the measuring worm corresponds to a measured distance equal to the pitch of the measuring worm.

If the measuring worm has a plurality of helices which may belong to one or more worm spirals, it touches the object at a number of points whereby the frictional contact is improved and slipping may be reliably prevented. Thereby the measuring worm bridges hollows in the object and with rises it is only fleetingly lifted so that unevenness causes no errors in measurement. Since the pitch of the measuring worm remains unchanged even after wear and with foreign bodies or dirt sticking to it, this results in no error of measurement. If the measuring worm is provided with grooves or teeth to increase the frictional contact with the object the measurement result is not dependent upon how far the material of the object penetrates between the grooves, or how much the teeth penetrate into the material as the case may be. This follows in that — as previously mentioned — the pitch of the worm, and not the periphery, is the decisive factor in the measurement.

Figure 2:
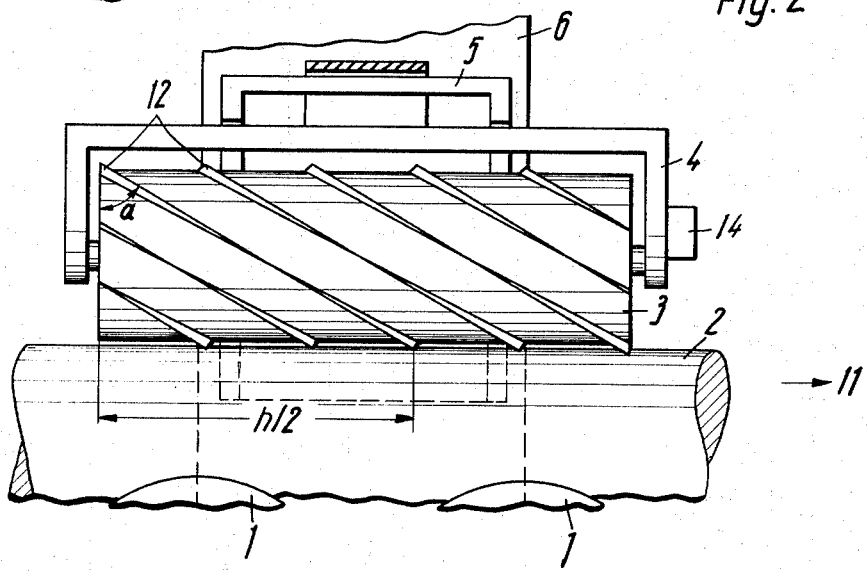

The invention is diagrammatically illustrated by way of example in the accompanying drawings in which:

FIG. 1 a front view of a device in accordance with the invention, partially in section;

FIG. 2 a side view of the device shown in FIG. 1, and

Figure 3:
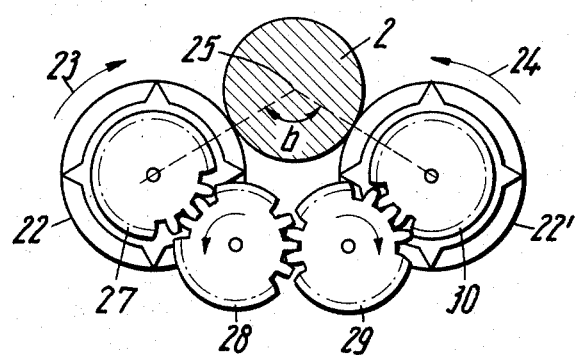

FIG. 3 a front view diagrammatic sketch of a modified arrangement.

The device shown in FIGS. 1 and 2 has guide and support rollers 1 mounted free to rotate, over which the object to be measured, e.g., a telephone cable 2 is drawn in the direction of the arrow 11, whereby the length of cable running over the roller 1 is to be measured in order, for example, to provide the cable 2 with linear markings by means of a device not illustrated. Opposite the guide rollers 1 a measuring worm 3 is rotatably mounted in a bracket 4. This bracket is pivoted about a vertical axis to a leg of an angle piece 5 and may be fixed in position so that the axis of the measuring worm 3 may be swung to a setting parallel to the direction of arrow 11 or swung against this direction by up to ± 10° in the horizontal plane. The other leg of the angle piece 5 is pivotably mounted about a horizontal axis on base 6 (only part of which is illustrated) by means of two self-aligning bracket pivots 13 disposed one behind the other parallel to the direction of arrow 11 and illustrated diagrammatically. Between the base 6 and the angle piece 5 a device works to balance the dead weight of the unit consisting of the angle piece 5, the bracket 4 and the measuring worm 3. This device consists of a pre-loadable spring 7 mounted at one end in the base, and which lies with its other end on the opposite leg of the angle piece 5. Further an adjustable feed device for the measuring worm 3 is disposed between this leg and the base. This device has a striker 8 working on the leg and which is connected with a diaphragm 9 which can be driven by a pressure medium.

The measuring worm 3 is formed with a plurality of helices, the pitch angle $a$ of which is 60° and the section of the helices 12 is triangular.

For the inertia-less transmission of the rotation of the measuring worm 3 to a counting unit 10 controlling the linear marking device, a photo-electric device 14 is provided, which for example emits one electric impulse to the counting unit 10 per rotation.

If the cable 2 is drawn through the device in direction 11, it endeavours to drive the helices or windings 12 of the measuring worm 3 adjacent to it in the direction of movement 11. Thereby the measuring worm 3 is rotated in the arrow direction 15, whereby each rotation corresponds to a path of movement of the cable 2 which is equal to the pitch $h$ of the measuring worm 3.

Departing from the embodiment example described in FIG. 1 and 2 the device can also comprise a plurality of measuring worms. FIG. 3 shows an example with two measuring worms. Both measuring worms 22 and 22' have opposing direction of winding, but are otherwise of identical specification so that their common reaction exerts no torque on the cable 2. With the illustrated rotational directions 23 and 24 and the illustrated arrangement, in which the measuring worms 22 and 22' are disposed offset one from the other by an obtuse angle $b$ in relation to the axis 25 of the cable 2, the measuring worms 22 and 22' are inclined to draw the cable 2 into the space between the measuring worms whereby the friction contact between the measuring worms and the cable 2 is improved. If required a counter roller may be provided. With this embodiment the measuring worms 22 and 22' are connected with one another by a spur-gearing 27, 28, 29, 30.

However, if desired one measuring worm could be connected with the measuring unit and the other simply mounted free to rotate. Obviously more than two, although preferably an even number, of measuring worms may be provided, and advantageously each pair of measuring worms have opposing winding directions so that they rotate in opposition to one another. In order to balance the reactive moment exerted by one measuring worm, it can also be pressed against the object together with a measuring worm contrarotating coaxial with it, whereby as explained in connection with FIG. 3, the second worm may be either mounted free to rotate or connected with the first worm by a gearing which reverses the direction of rotation.

The device in accordance with the invention may be used for linear measurement of bodies with any profile and even for linear measurement on areal objects of measurement, whereby only the arrangement of the guide means, e.g., supporting and guide rollers, and in the case of several worms their arrangement as well, need be matched to the cross-section of the object to be measured.

I claim:

1. A linear measuring device, in which the object to be measured and rotatable means pressed thereagainst are moved relative to one another along the length to be measured, whereby the rotatable means is rotated to drive a measuring mechanism, comprising at least one pair of rotatable measuring worms comprising said rotatable means and adapted to be pressed against the object to be measured, the axis of said worms being disposed substantially parallel to the intended direction of motion of the object to be measured, and said worms having helixes thereon which have opposed winding directions, but which are otherwise the same and have the same pitch angle.

2. A device as claimed in claim 1, wherein the worms of the pair are connected to one another by gearing.

3. A device as set forth in claim 1, including a bracket, said pair of measuring worms rotatably mounted in said bracket, a base, a connecting piece pivotally mounted to said base and attached pivotally and fixably to said bracket, and an adjustable feed device and a device to balance the dead weight of the unit comprising said measuring worms and said connecting piece mounted on said base.

4. A device as claimed in claim 3, wherein the adjustable feed device has a striker acting on the connecting piece and which is adapted to be driven by a fluid pressure medium.

5. A device as claimed in claim 3 in which the device for balancing the dead weight has a spring supported at one side on the base and at the other side on the connecting piece, and an adjustable tensioning device.

6. A linear measuring device, in which the object to be measured and a rotatable body pressed thereagainst are moved relative to one another along the length to be measured, whereby the rotatable body is rotated to drive a measuring mechanism, comprising at least one rotatable measuring worm adapted to be pressed against the object to be measured, a bracket, said measuring worm rotatably mounted in said bracket on an axis disposed substantially parallel to the intended direction of motion of the object to be measured, a base, a connecting piece pivotally mounted to said base and attached pivotally and fixably to said bracket, and an adjustable feed device and a device to balance the deadweight of the unit comprising said measuring worm and said connecting piece mounted on said base.

7. A device as claimed in claim 6, wherein the adjustable feed device has a striker acting on the connecting piece and which is driven by a fluid pressure medium.

8. A device as claimed in claim 6 in which the device for balancing the dead weight has a spring supported at one side on the base and at the other side on the connecting piece, and an adjustable tensioning device.

9. A linear measuring device for elongated objects to be measured longitudinally, comprising a base, guide roller means mounted on the base and forming a roller path for longitudinally guiding an elongated object to be measured, a rotatable measuring roller, a bracket supporting said measuring roller and pivotably mounted on said base, a device for balancing the dead weight of the unit including said measuring roller and said bracket connected on said base, an adjustable feed device for pressing said measuring roller against the elongated object running on said roller path mounted between said bracket and said base, and a measuring mechanism drivingly connected to said measuring roller.

10. A device as set forth in claim 9, in which said measuring roller has a surface provided with at least one helix and the axis of rotation of said measuring roller is disposed substantially parallel to said roller path.

11. A device as set forth in claim 10, in which the helix is of substantially triangular cross-section.

12. A device as set forth in claim 10, in which pitch angle of said helix is approximately 60°.

13. A device as set forth in claim 10, wherein said adjustable feed device has a striker which is adapted to be driven by a fluid pressure medium.

14. A device as set forth in claim 10 in which said device for balancing the dead weight has a spring supported at one side on said base and at the other side on said bracket, and an adjustable tensioning device for said spring.

* * * * *